United States Patent
Masfaraud et al.

(10) Patent No.: US 7,911,166 B2
(45) Date of Patent: Mar. 22, 2011

(54) POLYPHASE ROTATING MACHINE EQUIPPED WITH AN IMPROVED CONTROL DEVICE

(75) Inventors: Julien Masfaraud, Paris (FR); Hugues Doffin, Creteil (FR); Farouk Boudjemai, Marcoussis (FR)

(73) Assignee: Valeo Equipements Electriques Moteur, Creteil (FR)

( * ) Notice: Subject to any disclaimer, the term of this patent is extended or adjusted under 35 U.S.C. 154(b) by 437 days.

(21) Appl. No.: 12/160,230

(22) PCT Filed: Jan. 11, 2007

(86) PCT No.: PCT/FR2007/050640
§ 371 (c)(1),
(2), (4) Date: Jul. 8, 2008

(87) PCT Pub. No.: WO2007/083054
PCT Pub. Date: Jul. 26, 2007

(65) Prior Publication Data
US 2009/0009111 A1     Jan. 8, 2009

(30) Foreign Application Priority Data
Jan. 20, 2006   (FR) .................................... 06 00535

(51) Int. Cl.
*H02P 6/00*  (2006.01)

(52) U.S. Cl. .................. 318/400.14; 318/599; 318/720; 318/721; 318/461; 318/715

(58) Field of Classification Search ............ 318/400.14, 318/599, 720, 721, 461, 715
See application file for complete search history.

(56) References Cited

U.S. PATENT DOCUMENTS

| | | | | |
|---|---|---|---|---|
| 4,271,385 A | * | 6/1981 | Azusawa | 318/722 |
| 5,182,500 A | * | 1/1993 | Shimada | 318/400.04 |
| 5,796,231 A | * | 8/1998 | Kyodo | 318/608 |
| 5,838,123 A | * | 11/1998 | Zhao | 318/400.14 |

FOREIGN PATENT DOCUMENTS
FR     2 026 121     9/1970

* cited by examiner

*Primary Examiner* — Rita Leykin
(74) *Attorney, Agent, or Firm* — Berenato & White, LLC

(57) ABSTRACT

A machine comprising a rotor, a stator (12), a control bridge (10) with controlled switches, and a control device (20, 30) supplying control signals (C) to the control bridge (10), wherein the control device comprises means (30) for applying to at least one switch of the control bridge a control signal with a phase-lead relative to a signal representing the position of the rotor relative to the stator. According to the invention, the applying means comprise means (30) for adjusting the phase lead (d) from a plurality of values for a given rotational speed of the rotor.

12 Claims, 3 Drawing Sheets

POLYPHASE ROTATING MACHINE EQUIPPED WITH AN IMPROVED CONTROL DEVICE

CROSS-REFERENCE TO RELATED APPLICATIONS AND CLAIM TO PRIORITY

This application relates to International Application No. PCT/FR2007/050640 filed Jan. 11, 2007 and French Patent Application No. 0600535 filed Jan. 20, 2006, of which the disclosures are incorporated herein by reference and to which priority is claimed.

FIELD OF THE INVENTION

The invention concerns a polyphase rotary electrical machine for a motor vehicle equipped with a control device, this rotary electrical machine possibly being able to be reversible as in the case of alternator starters, and an alternator starter.

PRIOR ART

A rotary electrical machine comprises conventionally a rotor and a stator. One of these elements has a direct current passing through it and thus generates a constant magnetic field of fixed orientation with respect to this element. The other element comprises a plurality of distinct windings angularly spaced apart; each winding has passing through it a current offset in phase with respect to that of the other windings so as to create a rotary magnetic field. The coexistence of the fixed-orientation field of the first element and the rotating field of the second element cause the rotation of these elements with respect to each other, that is to say the rotation of the rotor with respect to the stator.

The various currents are generally injected into the windings of the polyphase element through a bridge formed by power switches (in general diodes associated with power transistors).

This power bridge is in general controlled by an electronic module that fixes the opening and closing times of the switches and thus controls the phase of the various currents through the windings.

In order to determine the switch control times, the electronic module normally uses signals representing the position of the rotor with respect to the stator, such as for example position sensors regularly distributed over the circumference of the rotary machine, which each send periodic signals at the rotation frequency of the rotor and offset in phase with respect to one another.

In the case where the rotary electrical machine is reversible, the power bridge fulfils the role of a bridge rectifier during the functioning of the machine in alternator mode.

In this context, it was proposed by the document FR 2 823 030 to allow the functioning of the rotary electrical machine as an electric motor according to two distinct characteristic modes, namely a so-called "starter" mode for driving the thermal engine of the vehicle and a so-called "auxiliary motor" mode for driving an appliance requiring a torque of lower value.

To allow functioning according to these two modes, the document FR 2 823 030 proposes to offset the control signals for the power bridge in time, in practice by means of a permutation and a reversal of the signals issuing from the position sensors.

However, according to this solution, the phase offset is determined biuniquely according to the speed by the components of the analogue circuit. The offset-speed relationship is therefore fixed and can therefore in particular not be adapted to the various situations that may be encountered (starting, dynamic assistance, etc). In addition, the choice of this relationship lacks flexibility since it is determined according to the circuit elements used. This design also involves the use of an analogue circuit with characteristics inherent for each type of machine that it is wished to manufacture, which complicates the manufacture of the machines at an industrial level.

OBJECT OF THE INVENTION

To avoid these problems and thus to allow in particular greater flexibility in the use of the phase offset of the signals issuing from the sensors, the invention proposes a polyphase rotary electrical machine equipped with an improved control device.

The polyphase rotary electrical machine for a motor vehicle comprises a rotor, a stator, a control bridge with controlled switches and a control device supplying control signals to the control bridge, the control device comprising means for applying, to at least one switch of the control bridge, a control signal with a phase lead with respect to a signal representing the position of the rotor with respect to the stator.

According to the invention, the said means for applying comprise means for adjusting the phase lead from a plurality of values for a given rotation speed of the rotor.

According to non-limitative embodiments, the device according to the invention can comprise one or more of the following characteristics:

The means for adjusting the phase lead are for example able to adjust the phase lead over a range of values for a given rotation speed of the rotor.

In order to allow a particularly effective functioning of the machine, the range of values can be defined as follows: for a given rotation speed in revolutions per minute ω of less than 1200 rev/min, the said range of values has for example as its upper limit an angle equal in degrees to $$60 + \frac{\omega}{30},$$

and/or for example as its lower limit an angle equal in degrees to $$\frac{3}{80} \cdot (\omega - 400);$$

for a rotation speed above 1200 rev/min, the said range of values has for example as its upper limit an angle of 100°.

According to one possibility of implementation, it is possible to provide means for determining the phase lead at a given rotation speed according to information relating to the torque to be generated. The torque generated by the machine is thus adjusted by means of the offset chosen.

It is also possible to make provision for determining the phase lead at a given rotation speed so that the efficiency of the machine is maximum, which may be advantageous in certain applications.

According to another possibility of implementation, original per se, the phase lead is such that the control bridge causes a rotation of the said machine in the opposite direction. It is thus possible to control the direction of rotation of the machine by virtue of the phase offset.

In this case, it is possible for example to make provision, for a rotation speed above 1200 rev/min, for the phase lead to be between 200° and 270° and/or, for a given rotation speed in revolutions per minute ω of less than 1200 rev/min, for the phase lead in degrees to be less than $$230 + \frac{\omega}{20}$$

and 270° and/or greater than $$90 + \frac{11}{120} \cdot \omega.$$

These phase offset values correspond particularly well to rotation in the opposite direction.

The invention also proposes an alternator starter equipped with a polyphase rotary electrical machine as briefly described above.

BRIEF DESCRIPTION OF THE FIGURES

Other characteristics and advantages of the invention will emerge in the light of the following description, given with reference to the accompanying drawings, in which.

DETAILED DESCRIPTION OF NON-LIMITATIVE EMBODIMENTS OF THE INVENTION

Figure 1:
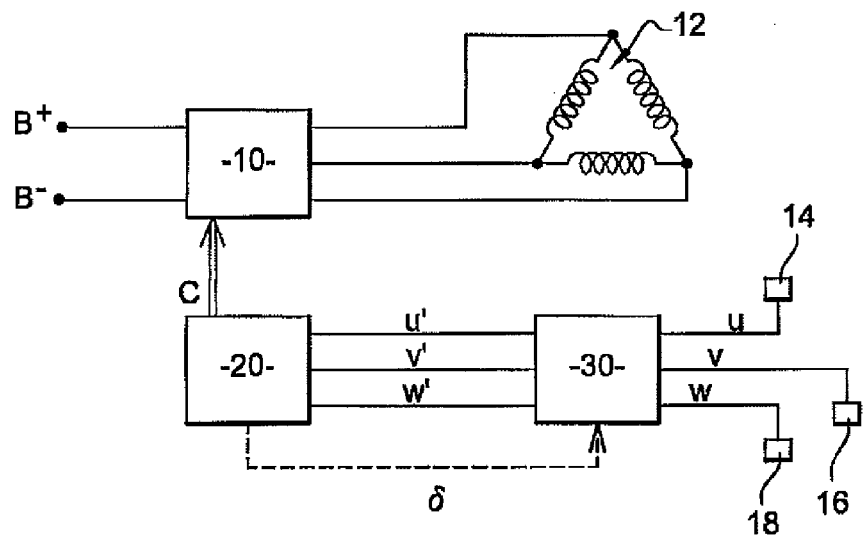
FIG. 1 depicts the elements of the electrical circuit of a polyphase rotary electrical machine comprising a phase-lead unit.

FIG. 1 depicts the essential elements of the electrical circuits of a polyphase rotary electrical machine, for example, reversible of the alternator starter type.

Such a machine comprises a power bridge 10 that supplies the three phases of a three-phase stator 12 from a voltage generated between the two terminals B$^+$, B$^-$ of a supply battery.

The power bridge 10 is formed by switches (not shown) that are controlled by control signals C so that the various windings of this data have signals passing through them offset in phase by 120° with respect to each other.

The control signals C are generated by an electronic control module on the basis of signals U, V, W issuing from three linear sensors 14, 16, 18 equally distributed over the circumference of the rotary machine.

Precisely, the signals U, V, W issuing from the sensors are processed by a control device called a phase-lead unit 30 that delivers three signals U', V', W' corresponding to the sensor signals U, V, W with a phase lead δ with respect to these.

The signals U', V', W' generated by the phase-lead unit 30 are used by a control circuit 20 to form the control signals C for the power bridge 10.

The phase lead δ mentioned above depends for example on the speed of the machine as measured by means of the sensor signals U, V, W. The phase lead δ can in this case be determined in real time within the phase-lead unit 30 as described below.

In a variant, provision can be made for the control circuit 20 to generate a signal relating to the phase-lead value δ as indicated in dotted lines in FIG. 1. To do this, the control circuit comprises for example a microcontroller (including a microprocessor) that determines the rotation speed of the machine on the basis of the signals U', V', W' and that deduces therefrom the phase offset δ to be used, possibly also a function of other conditions such as the operating phase. The offset value δ associated with a given operating speed and condition is for example stored within the microcontroller in a look-up table.

When the machine is functioning in alternator mode, the power bridge 10 fulfils the role of a bridge rectifier that transmits the energy of the machine (and in particular the stator 12) to the battery (terminal B$^+$, B$^-$).

Figure 2:
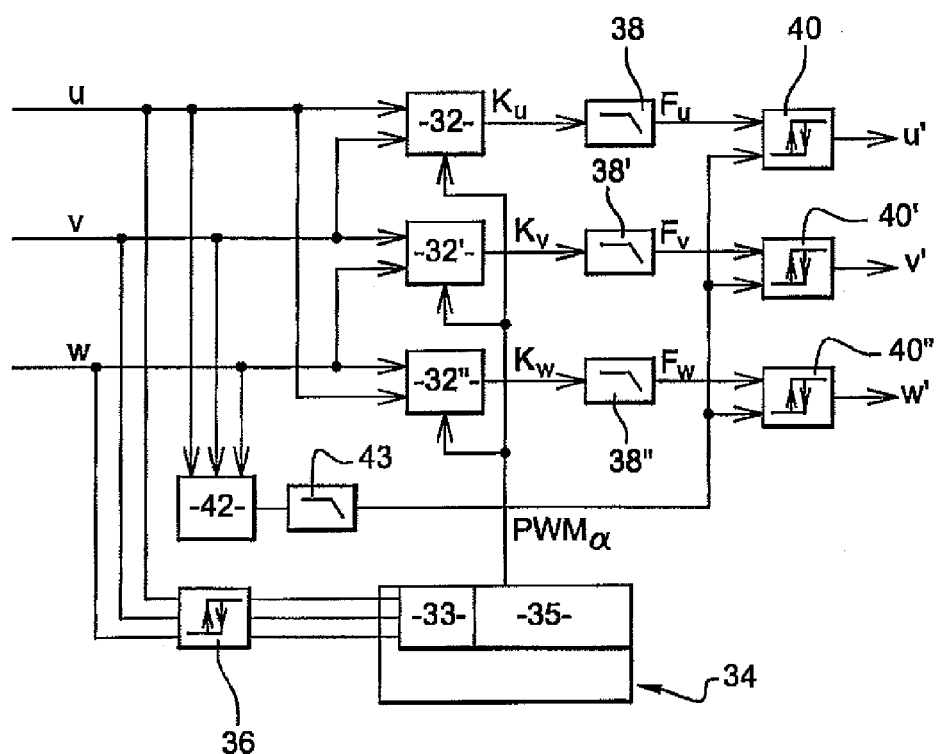
FIG. 2 depicts an embodiment of the phase-lead unit of FIG. 1 comprising a mixing circuit.

FIG. 2 depicts an embodiment that can be envisaged for the phase-lead unit 30.

In this embodiment, each signal U, V, W issuing from a sensor 14, 16, 18 is applied to a first input of a so-called "mixing" circuit respectively 32, 32', 32", example embodiments of which will be give hereinafter.

Each mixing circuit 32, 32', 32" also receives, on a second input, the signal V, W, U issuing from the sensor and having a phase lead of 120° with respect to the sensor signal U, V, W received at its first input.

Thus each mixing circuit 32, 32', 32" receives at its first input one of the sensor signals U, V, W and at its second input the sensor signal V, W, U in phase lead of 120° with respect to that received at the first input.

Each mixing circuit 32, 32', 32" also receives a control signal PWM$_\alpha$ formed by pulses with a duty cycle ratio α. The control signal PWM$_\alpha$ controls the switching elements of the mixing circuits 32, 32' 32" as described below.

In the embodiment depicted in FIG. 2, the same control signal PWM$_\alpha$ is applied to all the three mixers 32, 32', 32". In a variation, it would naturally be possible to provide specific control signals for each mixing circuit.

In the embodiment depicted the control signal PWM$_\alpha$ is generated on a pin of a microprocessor 34, a part 35 of which is dedicated to the generation of this control signal PWM$_\alpha$ (part means here a part of the software that controls the microprocessor 34; in a variant, fulfilling the same function in hard-wired logic could be envisaged).

As can be seen in FIG. 2, the microprocessor 34 also receives the signals U, V, W issuing from the sensors 14, 16, 18 through a first hysteresis trigger circuit 36. The signals thus received are intended for a part 33 of the microprocessor 34 dedicated to the determination of the speed of the rotary machine.

The rotation speed information thus determined is in particular used in the microprocessor 34 to determine the phase lead to be achieved by the phase-lead unit 30 according to which the duty cycle ratio α of the signal PWM$_\alpha$ to be applied to the mixing circuit 32, 32', 32" is determined.

The relationship between the speed determined by the speed determination part 33 and the duty cycle ratio α (either directly or by means of the phase offset δ) is for example stored in a memory associated with the microprocessor 34 in the form of a look-up table.

The phase offset δ desired (and consequently the duty cycle ratio α used) may naturally depend on parameters other than the rotation speed of the rotary machine, such as for example the operating mode of the rotary machine. It is in this case possible to provide several look-up tables as mentioned above, each table being used in a specific operating mode of the rotary machine.

As will be seen hereinafter in the light of the example embodiments of the mixing circuits 32, 32', 32", the latter form two different types of combination of the signals that they receive as an input depending on whether the control signal $PWM_\alpha$ is high level or low level. (Here if applicable combination means a combination in which one of the two signals has a zero weight, that is to say only the other signal is transmitted.)

The alternation of the two types of combination (signals $K_u$, $K_v$, $K_w$) is emitted at the output of each mixing circuit 32, 32', 32" and sent to a low-pass filter, the cutoff frequency of which is lower than the frequency of the control signal $PWM_\alpha$ (that is to say than the alternation frequency of the two types of combination) so that the filtered signal at any moment forms the average of the combinations of the two types, weighted by the duration of each, which naturally depends on the duty cycle ratio $\alpha$ of the control signal $PWM_\alpha$.

The cutoff frequency of each low-pass filter 38, 38', 38" is however higher than the frequency of the signals of U, V, W so as to allow this component of the information to pass. In the light of the conventional rotation speeds of rotary machines and the frequency of the sensor signals that result from this (typically between 0 and 600 Hz), a cutoff frequency of 10 KHz is for example used, which makes it possible to use for example also a frequency of 130 kHz for the control signal.

The filtered signal $F_u$, $F_v$, $F_w$ emitted by each low-pass filter 38, 38', 38" is therefore a combination of the sensor signals received at the input of the corresponding mixing circuit 32, 32', 32" in which the influence of each of the signals received at the input of the corresponding mixing circuit 32, 32', 32" depends on the duty cycle ratio of the control signal $PWM_\alpha$. In this way a signal is obtained whose phase is between the phases of the input signals and adjustable by modification of the duty cycle ratio $\alpha$ of the control signal $PWM_\alpha$.

The filtered signals $F_u$, $F_v$, $F_w$ are applied respectively to a first input of second corresponding hysteresis trigger circuits 40, 40', 40", which each receive at a second input the average of the sensor signals U, V, W determined by an averaging circuit 42 and by a low-pass filter 43 of the same type as the low-pass filters 38, 38', 38" previously mentioned. By virtue of the use of the hysteresis triggers 40, 40', 40", the voltage offsets generated in the mixing circuits 32, 32', 32" are dispensed with.

In this way signals U, V, W corresponding respectively to the input sensor signals U, V, W with a phase advance that depends on the duty cycle ratio $\alpha$ of the control signal $PWM_\alpha$ are thus obtained at the output of the hysteresis triggers 40, 40', 40".

Figure 3:
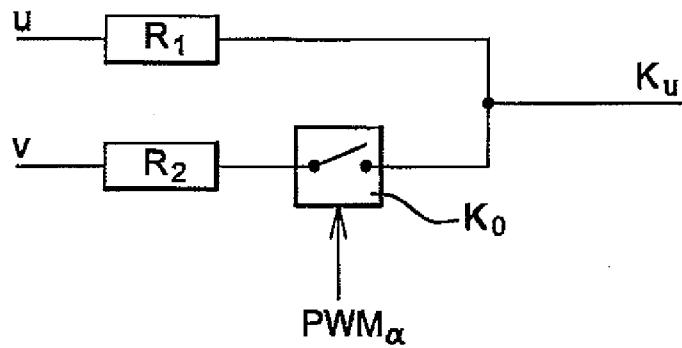
FIGS. 3 and 4 depict possible embodiments of a mixing circuit of FIG. 2.

FIG. 3 depicts a first example that can be envisaged for using each of the mixing circuits 32, 32', 32" described above. This example is written as an implementation of the mixing circuit 32 (which receives as an input the signal U and the signal V in phase lead of 120° with respect to the signal U), but applies identically to the mixers 32', 32" by applying respectively as an input the signals V and W and the signals W and U.

In this example embodiment, the first signal (here the signal U) is applied to a node forming the output through a resistor R1, while the second signal $K_u$ (here the signal V) is applied to this same node through the series association of a resistor R2 and a switch $K_o$ switched on command from the control signal $PWM_\alpha$.

There is thus obtained as an output (that is to say at the aforementioned node) a signal $K_u$ that depends only on the sensor signal U during the phases of the control signal $PWM_\alpha$ that forces the opening of the switch $K_o$, while the output signal $K_u$ depends both on the signals U and V (also weighted according to the resistors R1 and R2) during the phases of the control signal $PWM_\alpha$ that cause the closure of the switch $K_o$. This solution therefore makes it possible to obtain, after low-pass filtering, a filtered signal $F_u$.

It can thus be seen clearly that, for values of the duty cycle ratio $\alpha$ varying between 0 and 1, an output signal $F_u$ is obtained whose phase varies between that of the signal U itself (when $\alpha=0$) and a phase close to that of the signal V (itself in phase lead of 120° with respect to the signal U) when $\alpha=1$, by choosing appropriate values for R1 and R2 (the larger R1 is with respect to R2, the more the phase lead of $F_u$ approaches 120° for $\alpha=1$).

Figure 4:
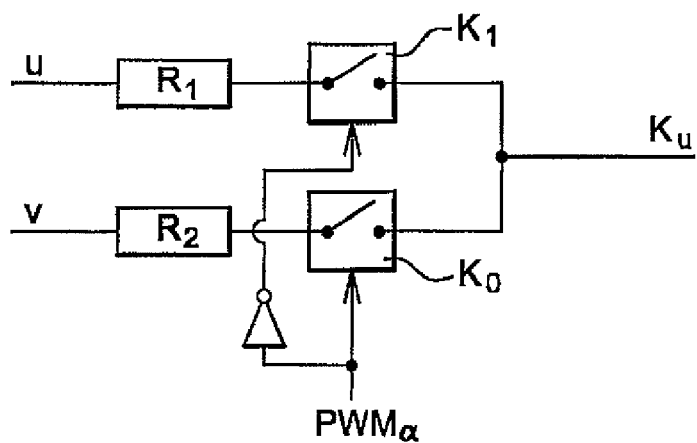

FIG. 4 depicts a second example embodiment for the mixing circuits 32, 32', 32" of FIG. 2.

As before, the example described applies to the mixing circuit 32 but would apply identically to the mixing circuit 32', 32".

In this second example, the sensor signal U is transmitted to a node forming an output through the series association of a resistor R and a switch $K_1$, while the sensor signal V is transmitted to the node forming an output through the series association of a resistor R2 and a switch $K_o$.

The switch $K_o$ is switched according to the control signal $PWM_\alpha$ while the switch $K_1$ receives the same control signal $PWMC_\alpha$ through an inverter so that the switch $K_1$ is switched opposite to the switch $K_o$.

In the phases where the control signal $PWM_\alpha$ causes the opening of the switch $K_o$, it thus causes the closure of the switch $K_1$ so that the output signal $K_u$ (at the node forming an output) depends only on the sensor signal U).

Conversely, when the control signal $PWM_\alpha$ causes the closure of the switch $K_o$, it also cause the opening of the switch $K_1$ so that the output signal $K_u$ depends only on the sensor signal V.

This solution makes it possible to obtain, after low-pass filtering, the filtered signal $F_u$.

As before, by varying the duty cycle ratio $\alpha$ between 0 and 1, a phase lead of the signal $F_u$ is obtained with respect to the signal U variable between 0° (for $\alpha=0$) and this time precisely 120° (for $\alpha=1$).

Figure 5:
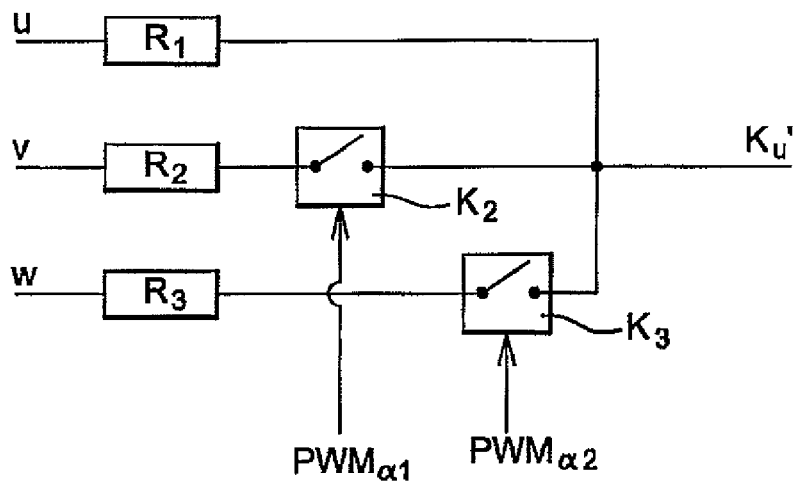
FIG. 5 depicts a variant embodiment of the mixing circuit.

FIG. 5 shows a variant embodiment of a mixing circuit according to which the mixing circuit receives as an input the three sensor signals U, V, W.

The sensor signal U is transmitted to a node forming an output through a resistor R1.

The sensor signal V (in phase lead of 120° with respects to the signal U) is transmitted to the node forming an output through the series association of a resistor R2 and a first switch $K_2$ controlled by a first control signal $PWM_\alpha$.

The sensor signal W for its part is transmitted to the node forming the output through a series association of the same type, namely a resistor R3 and a second switch $K_3$ controlled by a control signal $PWM_{\alpha 2}$.

A signal $F_u$ is therefore obtained after low-pass filtering as described previously.

The lead of the phase output signal can thus vary between 0° and a value slightly less than 240° (by choosing resistance values for the resistors R1, R2, R3 that make the signal U on the output node $K'_u$ negligible when the switch $K_3$ is closed).

Figure 6:
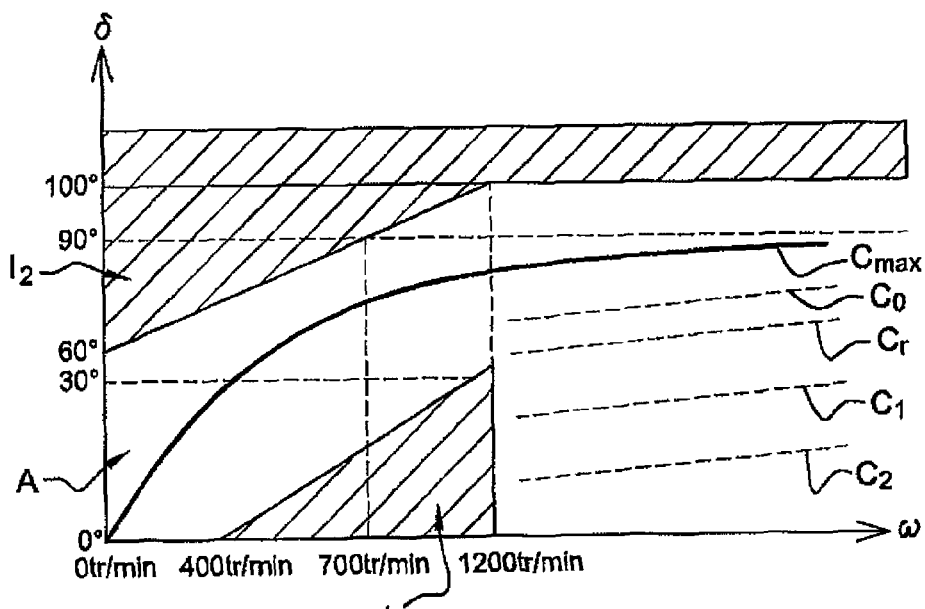
FIGS. 6 and 7 depict examples of possible choices for the phase shift value δ according to the rotation speed ω of the rotary machine.

FIG. 6 presents the relationships that may exist between the offset $\delta$ of the machine and the rotation speed $\omega$ of the machine in an example embodiment thereof.

In this example, the functioning at low speed (here for rotation speeds ω of less than 1200 rev/min) is distinguished from functioning at higher speeds) here ω greater than 1200 rev/min).

In each case, the solution described previously makes it possible to envisage a plurality of possible phase offsets δ for a given value ω of the rotation speed of the rotary machine, for example according to the intended use.

However, in order to obtain a correct functioning of the whole, the phase offset values used δ are limited to ranges as shown in FIG. 6.

Thus, for speeds ω of less than 1200 rev/min, provision is made for the phase value δ emitted by the microprocessor 34 to remain in an acceptable zone A delimited by the straight lines $$\delta = \frac{3}{80} \cdot (\omega - 400) \text{ and } \delta = 60 + \frac{\omega}{30}.$$

The phase offset value δ thus never reaches the prohibited zones I1 and I2 corresponding respectively to phase offset values δ less than and greater than the permissible values.

Likewise the microprocessor 34 delivers, for higher speeds (ω greater than 1200 rev/min), a phase value δ of less than 100°.

In the acceptable ranges (namely the range A previously defined for rotation speed values ω of less than 1200 rev/min and the range formed by the values of less than 100° for speeds greater than 1200 rev/min, the phase offset value δ can be determined according to the rotation speed ω in each particular case of use, for example as already mentioned by means of a look-up table stored in a memory associated with the microprocessor 34.

For example, when the generation of a maximum torque by the rotary machine is sought, the look-up table for this use stores the match between the rotation speed ω and the phase offset δ given by the curve $C_{max}$ in FIG. 6.

It is also possible to use the rotary electrical machine to adjust the torque to a certain value. In particular, when this machine is associated with a thermal engine as in the case of alternator starters, the phase offset value δ can be determined according to the torque sought, as illustrated in FIG. 6 where each curve $C_o$, $C_1$, $C_2$ gives the relationship between the rotation speed ω and the phase offset δ that makes it possible to make obtain this torque value.

Among the torque values that can thus be envisaged, it is possible in particular to seek to achieve the torque where the efficiency is optimum, in which case the relationship between the rotation speed ω and phase offset δ is given by the curve $C_r$ in FIG. 6.

The possibility of determining the phase offset δ as a function of the rotation speed ω in a flexible manner also makes it possible to envisage values that cause the rotation of the rotary machine in a direction of rotation opposite to the direction conventionally envisaged.

Figure 7:
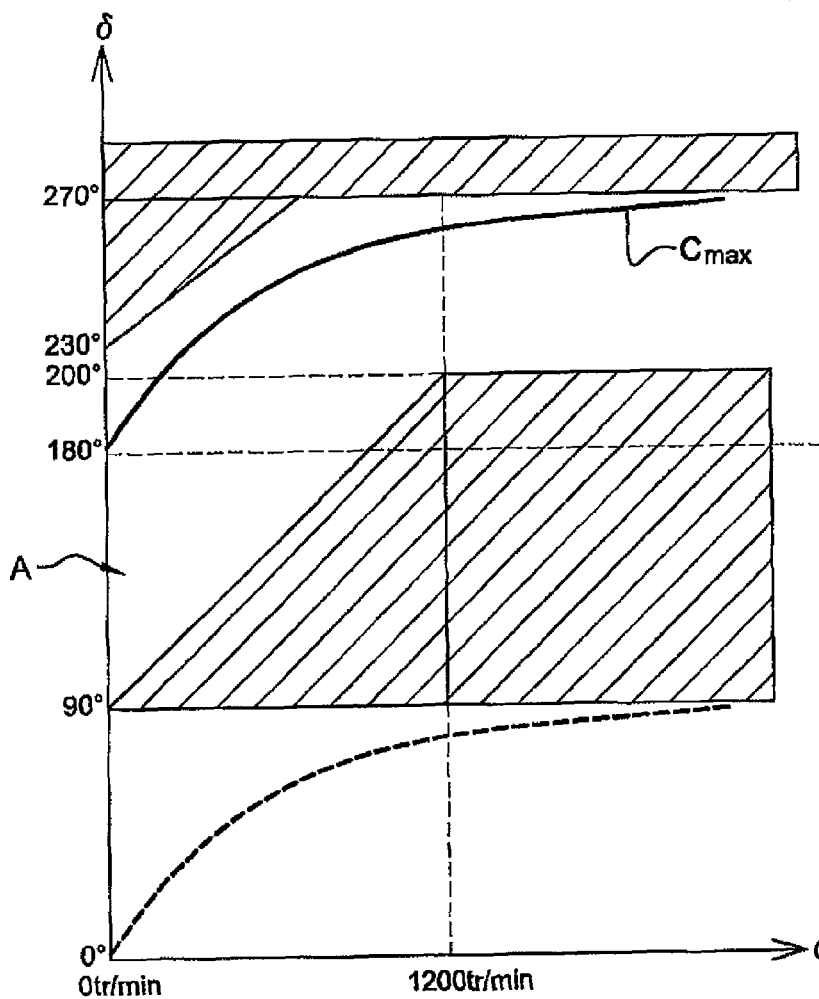

This, as visible in FIG. 7, it is possible to make provision for making a phase offset δ change in an acceptable range of values A delimited in its lower part by a straight line of equation $$\delta = 90 + \frac{11}{120}.$$

ω for ω between 0 and 1200 rev/min and a straight line of equation δ=200° for ω greater than 1200 rev/min, and in its upper part by a straight line of equation $$\delta = 230 + \frac{\omega}{20}$$

for ω between 0 and 800 rev/min and δ=270° for ω greater than 800 rev/min.

FIG. 7 also shows a curve $C_{max}$ that gives the relationship between the rotation speed ω and the phase offset δ when it is sought to maximise the torque. As before, other phase offset values δ can be associated with speeds ω for other uses, while remaining in the range A of acceptable values defined previously.

The above examples represent only possible embodiments of the invention, which is not limited to them.

The invention claimed is:

1. Polyphase rotary electrical machine for a motor vehicle comprising a rotor, a stator (12), a control bridge (10) with controlled switches, and a control device (20, 30) supplying control signals (C) to said control bridge (10), said control device (20, 30) comprising means (30) for applying to at least one said controlled switches of said control bridge (10) a control signal of said control signals (C) with a phase lead (δ) with respect to a signal representing the position of said rotor with respect to said stator, wherein said means for applying (30) said control signal comprise means (32, 38, 34) for adjusting the phase lead (δ) from a plurality of values for a given rotation speed (ω) of the rotor.

2. Machine according to claim 1, wherein the means for adjusting the phase lead (δ) are able to adjust the phase lead over a range of values (A) for a given rotation speed of the rotor.

3. Machine according to claim 2, wherein, for a given rotation speed in revolutions per minute ω of less than 1200 rev/min, said range of values (A) has at its upper limit an angle equal in degrees to:

60+ω/30.

4. Machine according to claim 2, wherein, for a given rotation speed in revolutions per minute ω of less than 1200 rev/min the said range of values (A) has as its lower limit an angle equal in degrees to:

3/80×(ω−400).

5. Machine according to claim 2, wherein, for a rotation speed of more than 1200 rev/min, said range of values has as its upper limit an angle of 100°.

6. Machine according to claim 1, further comprising means for determining the phase lead (δ) at a given rotation speed (ω) according to information relating to the torque to be generated ($C_{max}$, $C_0$, $C_1$, $C_2$, $C_r$).

7. Machine according to claim 1, further comprising means for determining the phase lead (δ) at a given rotation speed (ω) so that the efficiency of the machine is maximum.

8. Machine according to claim 1, wherein the phase lead (δ) is such that the control bridge (10) causes a rotation of aid machine in the opposite direction.

9. Machine according to claim 8, wherein, for a rotation speed above 1200 rev/min, the phase lead (δ) is between 200° and 270°.

10. Machine according to claim 8, wherein, for a given rotation speed δ in revolutions per minute of less than 1200 rev/min, the phase lead (δ) is less than 230+ω/20 and 270°.

11. Machine according to one of claims 8 to 10, characterised in that, for a given rotation speed ω in revolutions per minute of less than 120 rev/min, the phase lead (δ) in degrees is greater than 90+11/120×ω.

12. Alternator starter for a motor vehicle, comprising a machine according to claim 1.

* * * * *